(12) United States Patent
Chang et al.

(10) Patent No.: US 10,420,384 B1
(45) Date of Patent: Sep. 24, 2019

(54) DECORATIVE OBJECT

(71) Applicant: PROVIDE CREATIONS, INC., San Diego, CA (US)

(72) Inventors: Marcus Chang, Carlsbad, CA (US); Hans Chang, Shanghai (CN)

(73) Assignee: PLANETART, LLC, Calabasas, CA (US)

(*) Notice: Subject to any disclaimer, the term of this patent is extended or adjusted under 35 U.S.C. 154(b) by 0 days.

(21) Appl. No.: 16/054,129

(22) Filed: Aug. 3, 2018

(51) Int. Cl.
*A41G 1/00* (2006.01)
*B29D 22/00* (2006.01)
*B44F 1/06* (2006.01)
*B44C 5/06* (2006.01)
*F21V 23/04* (2006.01)
*F21W 121/00* (2006.01)

(52) U.S. Cl.
CPC .............. *A41G 1/008* (2013.01); *A41G 1/005* (2013.01); *B29D 22/00* (2013.01); *B44C 5/06* (2013.01); *B44F 1/06* (2013.01); *B29K 2995/0026* (2013.01); *F21V 23/04* (2013.01); *F21W 2121/00* (2013.01)

(58) Field of Classification Search
CPC ........ A41G 1/008; A41G 1/005; B29D 22/00; B44C 5/06; B44F 1/06; B29K 2995/0026; F21V 23/04; F21W 2121/00
See application file for complete search history.

(56) References Cited

U.S. PATENT DOCUMENTS

| 5,567,045 | A | * | 10/1996 | Bucek | ................. F21V 3/00 362/363 |
|---|---|---|---|---|---|
| 8,579,459 | B2 | | 11/2013 | Ma | |
| 9,759,413 | B2 | | 9/2017 | Lien | |
| 2017/0222095 | A1 | | 8/2017 | Yamashita | |

FOREIGN PATENT DOCUMENTS

GB 809785 A * 3/1959 ............... B44C 5/04

* cited by examiner

*Primary Examiner* — Mary Ellen Bowman
(74) *Attorney, Agent, or Firm* — Culhane Meadows PLLC; Robert C. Klinger

(57) ABSTRACT

An example apparatus includes a translucent hollow body, the hollow body having an inner surface and an outer surface. The example apparatus further includes a paint layer disposed on the outer surface of the translucent hollow body. The paint layer substantially covers the outer surface of the translucent hollow body with paint, the paint layer including exposed regions having paint removed to expose the outer surface of the translucent body. At least one exposed region forms a decorative shape.

6 Claims, 4 Drawing Sheets

DECORATIVE OBJECT

BACKGROUND

Decorative objects are commonplace, particularly during certain holidays. In one example, decorative pumpkins are displayed during Halloween. Such decorative pumpkins may be real pumpkins which are carved and/or hollowed out, with a light or a candle placed inside. Such pumpkins are generally disposed of after the holiday, and a new one is prepared for the next Halloween. Other similar objects may be prepared for different holidays.

BRIEF DESCRIPTION OF THE DRAWINGS

For a more complete understanding of various examples, reference is now made to the following descriptions taken in connection with the accompanying drawings in which.

DETAILED DESCRIPTION

Various examples describe a decorative object that may be used repeatedly. In one example the decorative object is a pumpkin. The decorative object may have a body formed of a translucent material, such as clear resin. The clear resin, when cured, forms a translucent body that allows at least some light to pass through. Paint may be applied to the outer surface of the body to provide the desired appearance. For example, in the case of a pumpkin, a layer of orange paint may be applied. The paint may be removed from selected portions of the outer surface to expose the translucent body. Thus, a light source positioned inside the translucent body may generate light that passes through the translucent portion, while being substantially blocked by the paint on other portions.

Figure 1:
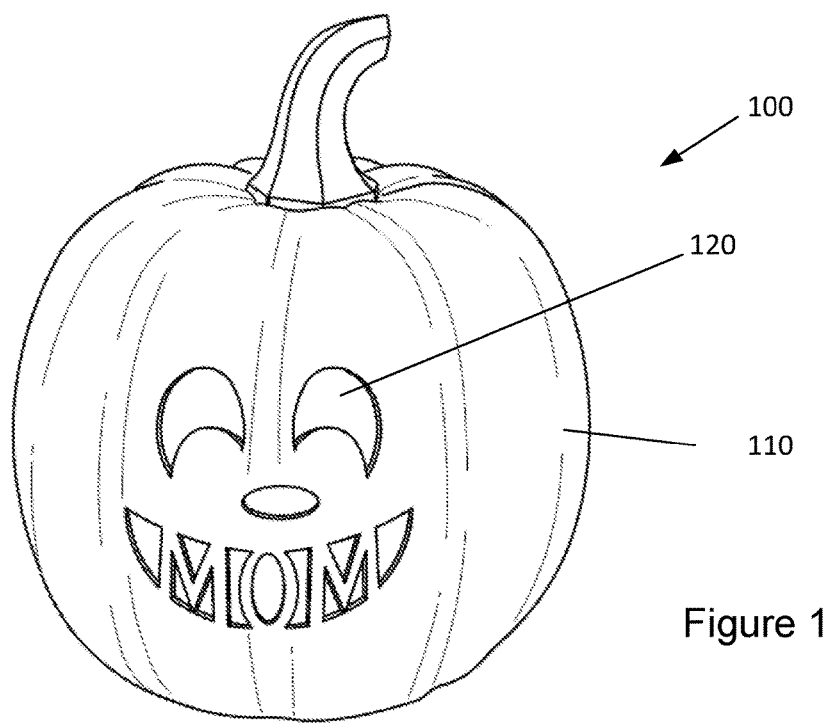
FIG. 1 illustrates a perspective view of an example decorative object.

Referring now to FIG. 1, a perspective view of an example decorative object 100 is illustrated. In the example illustrated in FIG. 1, the decorative object 100 has a body 110 that is formed as a pumpkin, or a jack-o-lantern. In other examples, the decorative object 100 may be formed as any of a variety of other shapes including, but not limited to, various figures such as a ghost, Christmas-themed objects such as a Christmas ornament or a snowman, or various other shapes.

In various examples, the body 110 of the decorative object 100 is formed of a translucent material. In one example, the translucent material is clear resin. As described with reference to FIGS. 2-7 below, the body 110 has a substantially hollow interior defined by an inner surface (not visible in FIG. 1).

A paint layer is provided on the outer surface of the body 110 to substantially cover an outer surface of the translucent material forming the body 110. The paint layer may include multiple layers of paint. In one example, the paint layer includes a layer of black paint and a layer of paint of a second color disposed on top of the layer of black paint. In this regard, the black paint may be provided to facilitate blocking of light from hollow interior from passing through the body 110. The layer of paint of the second color may provide the example object 100 with a desired appearance. For example, in the case of a pumpkin, the second color may be orange.

The example object 100 of FIG. 1 includes exposed regions 120 on the outer surface of the body 110. The exposed regions 120 have the paint layer removed from the outer surface. In various examples, the paint layer on the exposed regions 120 may be removed by any of a variety of methods. In one example, the paint layer on the exposed regions 120 is removed by laser etching. In some examples, a mask may be used to achieve the desired shape of the exposed regions 120.

The exposed regions 120, individually or collectively, may form a decorative shape. For example, in the example object 100 of FIG. 1, the exposed regions 120 form an image (e.g., with facial features) to form a jack-o-lantern and/or text letters forming at least one word or a name (e.g., "MOM"). With the paint layer removed at the exposed regions 120, the exposed regions 120 reveal the translucent body of the example object 100. Thus, when a light is placed or activated within the hollow interior of the body 110, the light is substantially blocked by the paint layer and substantially allowed to pass through the exposed regions 120.

In some examples, the example object 100 may be provided with an electronics portion, an example of which is described below with reference to FIG. 8. The electronics portion may include a power source (e.g., battery) and a light source coupled to the power source. The light source may be a light-emitting diode (LED) positioned within the hollow interior of the body 110. The electronics portion may include additional components, such as a timer, a power switch, a speaker, etc.

Figure 2:
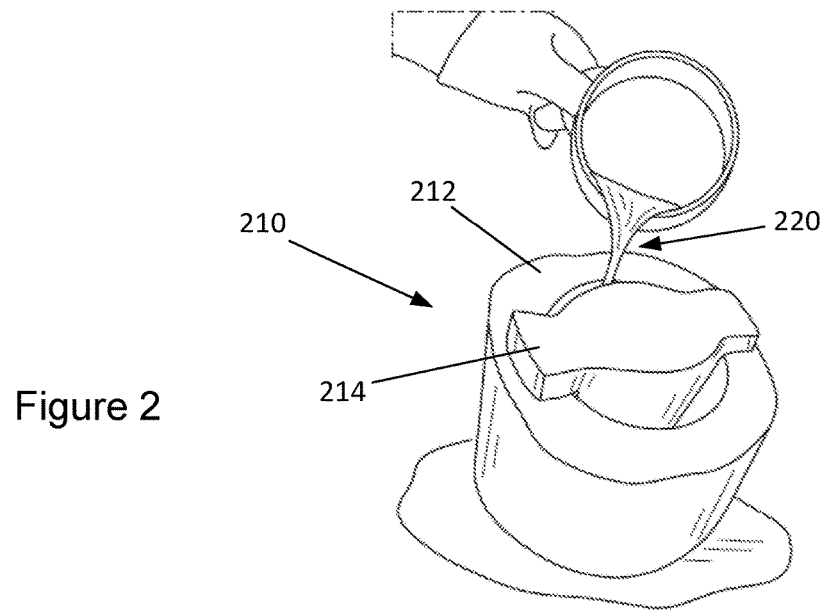
FIGS. 2-7 illustrate an example method of forming an example decorative object.

Referring now to FIGS. 2-7, an example method of forming an example decorative object is illustrated. Referring first to FIG. 2, a mold 210 for forming the desired object may be provided. The mold 210 includes an outer mold portion 212 and an inner mold portion 214. Together, the outer mold portion 212 and the inner mold portion 214 form a region into which body material 220 may be injected or poured. In one example, the body material is clear resin in fluid form and is poured into the region between the outer mold portion 212 and the inner mold portion 214.

In one example, the outer mold portion 212 may be formed of a rigid material and may be shaped to form the desired outer surface of a decorative object, such as the decorative object 100 of FIG. 1 or the decorative object 230 described below with reference to FIGS. 3-7. The inner mold portion 214 may be formed of a less rigid material, such as soft rubber which can retain its shape sufficiently while the body material 220 is curing. The material forming the inner mold portion 214 is sufficiently flexible to allow removal through an opening after the body material 220 is cured, as described below with reference to FIG. 4.

The body material (e.g., clear resin) is cured within the mold. In various examples, the curing of the material may be accomplished or facilitated by, for example, application of heat. In other examples, the body material 220 may be allowed to cure by retaining the body material 220 within the mold 210 for a sufficient length of time.

Figure 3:
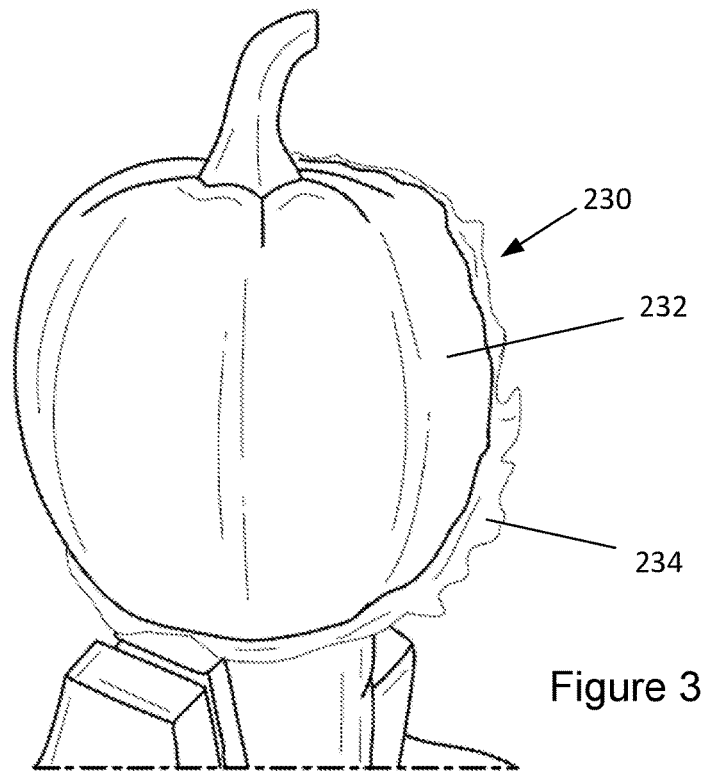

Referring now to FIG. 3, the outer mold portion 212 is removed to allow removal of a cured object 230. As illustrated in the example of FIG. 3, the cured object 230 is formed with a translucent body 232 formed of, for example, clear resin. Upon removal of the outer mold portion 212, the translucent body 232 may include some residual body material 234 which may be removed via post processing, such as sanding, to remove the residual body material 234.

The outer mold portion 212 forms a decorative outer surface on the translucent body 232, such as a pumpkin. The outer mold portion 212 may include multiple portions that can be selectively joined or separated. During molding, the multiple portions may be joined to form the outer mold portion 212 as illustrated in FIG. 2. Once the body material 220 is cured, the multiple portions may be separated to allow removal of the molded object 230.

Figure 4:
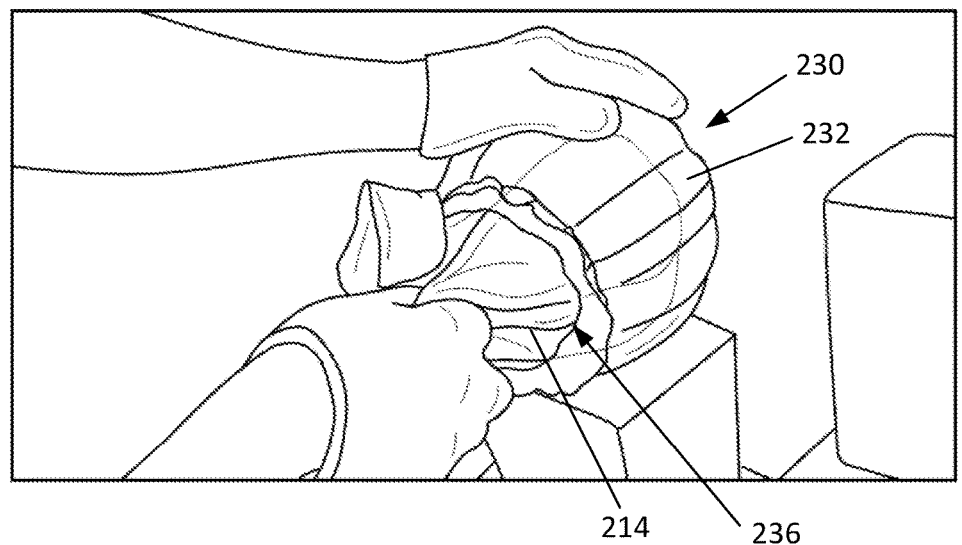

Referring now to FIG. 4, the molded object 230 is provided with an opening 236. In the example illustrated in FIGS. 2-4, the opening 236 is provided on the bottom of the pumpkin formed by the molded object 230. The inner mold portion 214 may be removed through the opening 236 by a technician. As described above, the inner mold portion 214 may be formed of a less rigid material, such as soft rubber. During the curing process, the inner mold portion 214 retains its shape sufficiently to form a desired hollow interior, as illustrated below with reference to FIG. 5. As illustrated in FIG. 4, the material forming the inner mold portion 214 is sufficiently flexible to allow removal through the opening 236 after the molded object 230 is formed. In one example, the inner mold portion 214 is formed of a soft rubber material.

Figure 5:
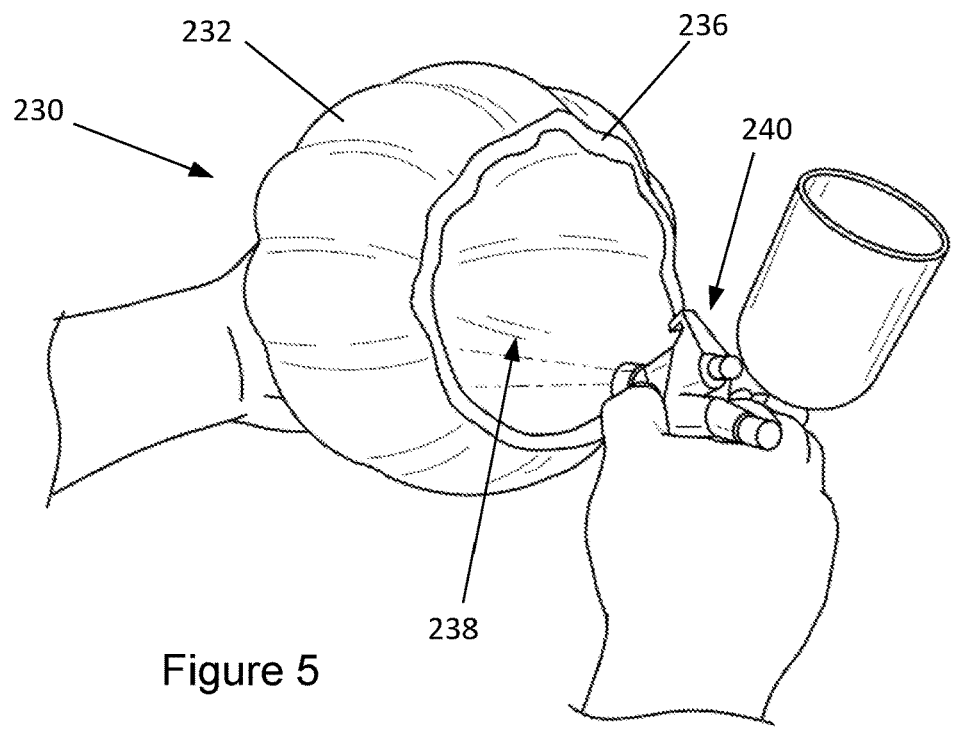

Referring now to FIG. 5, the molded object 230 is illustrated with the inner mold portion 214 removed. Thus, the molded object 230 includes a translucent body 232 with an opening 236 exposing a hollow interior 238. The soft rubber material provides a generally smooth interior surface of the hollow interior 239, which may reduce or eliminate optical anomalies on the translucent body. Such optical anomalies may include, for example, glaucoma effects which may result from a film that can distort transmission of light. In some examples, the clear resin material may be sealed on the inner surface of the hollow interior by depositing a clear coating 240. The clear coating 240 may be deposited in a variety of manner, such as by spraying as illustrated in FIG. 5.

Figure 6:
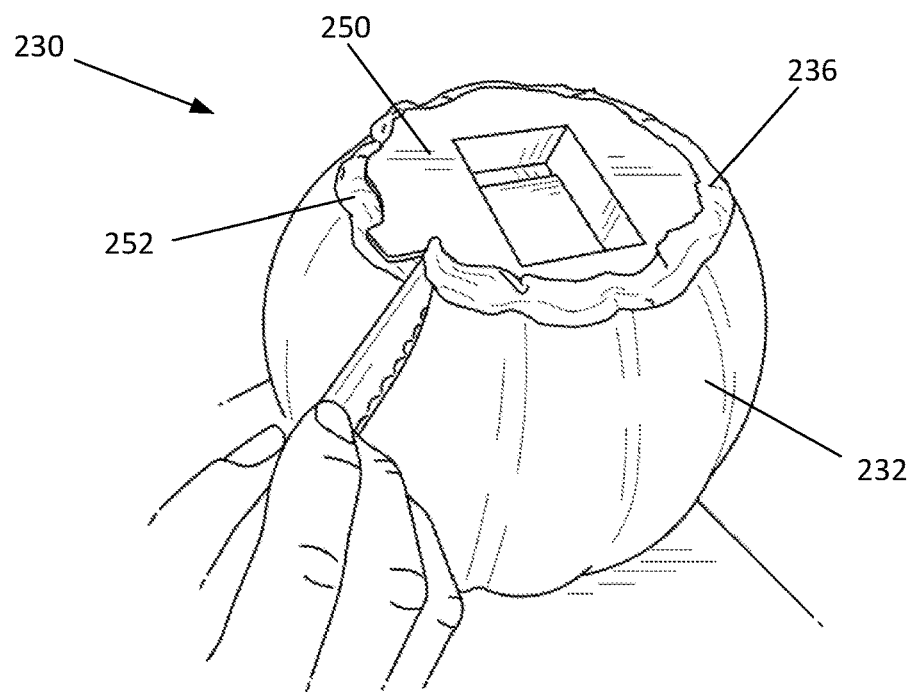

Referring now to FIG. 6, the opening 236 of the molded object 230 may be closed with a bottom portion 250 that may be, for example, a molded plastic component or a resin material. The bottom portion 250 may be secured to the opening 236 or sealed with a resin material, an epoxy or other appropriate material.

Figure 7:
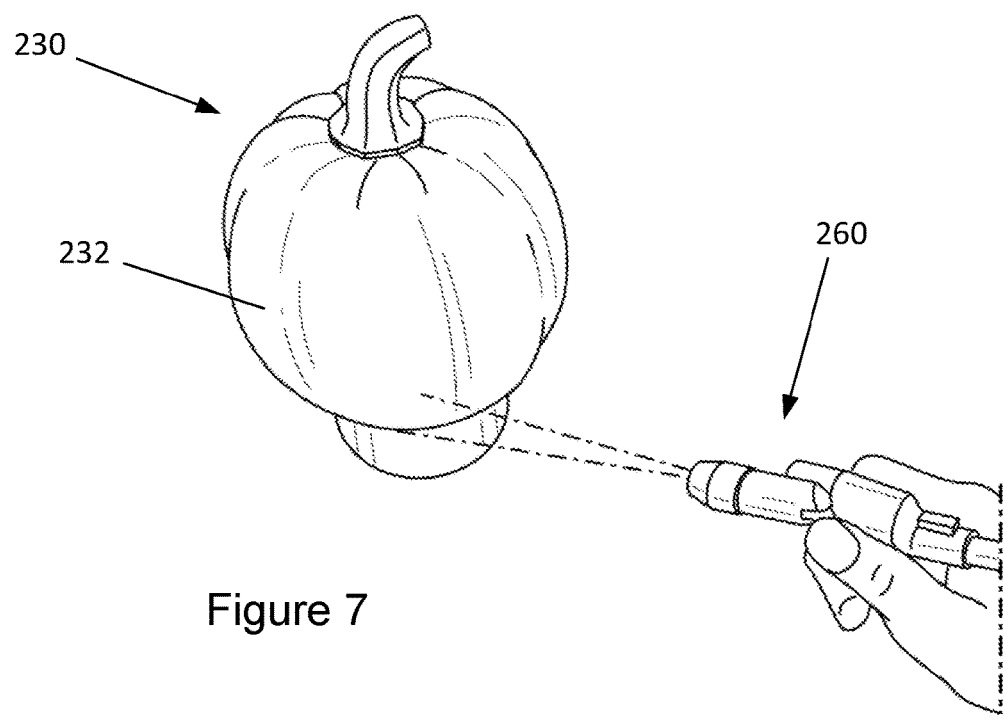

Referring now to FIG. 7, a paint layer may be deposited onto the translucent body 232 of the molded object 230. The paint layer may be formed by paint 260 that is deposited onto the translucent body 232. As noted above, the paint layer substantially covers the outer surface of the translucent body 232. The paint layer may include multiple layers of paint. In one example, the paint layer includes a layer of black paint and a layer of paint of a second color disposed on top of the layer of black paint. In this regard, the black paint may be provided to facilitate blocking of light from hollow interior from passing through the body 232. The layer of paint of the second color may provide the molded object 230 with a desired appearance. For example, in the case of a pumpkin, the second color may be orange.

Figure 8:
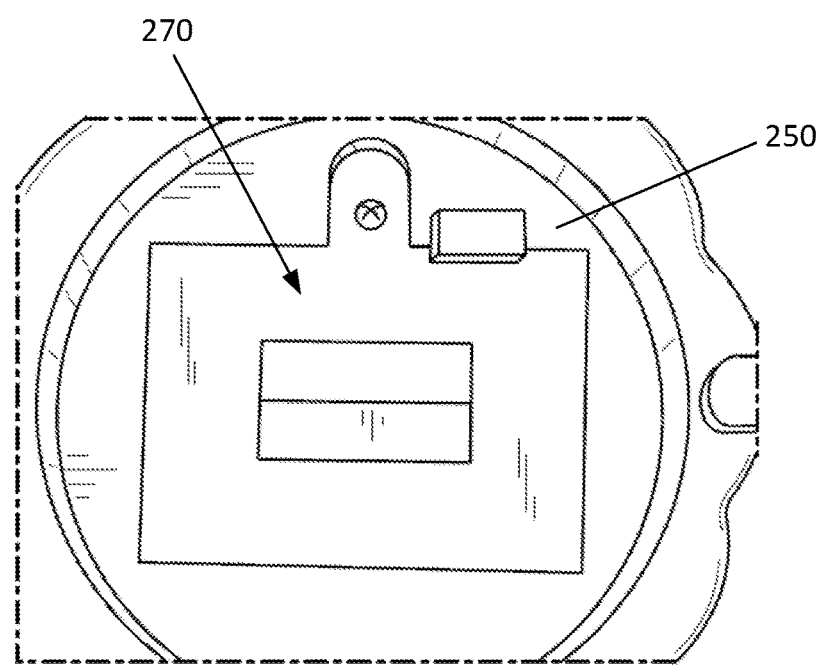
FIG. 8 is a bottom plan view of the example decorative object of FIGS. 2-7 illustrating an example electronics package.

Referring now to FIG. 8, the molded object 230 may be provided with an electronics portion 270 positioned in the bottom portion 250 described above with reference to FIG. 6. The electronics portion 270 may include a battery compartment to house one or more batteries therein. The battery compartment may be coupled to circuitry that includes a power switch. The power switch may selectively turn on or off a light source provided inside the hollow interior 238 (see FIG. 5).

As described above with reference to FIG. 1, certain portions of the paint layer may be removed to form exposed regions. The removal of the paint layer from the exposed regions exposes the translucent material forming the body 232 of the molded object 230. As illustrated in FIG. 1, the exposed regions can form a decorative shape, such as a jack-o-lantern. When the light source of the electronics portion 270 is turned on, the paint layer prevents or limits the amount of light passing through the body 232. Removal of the paint layer from the exposed regions allows light to pass through the translucent material forming the body 232. Thus, the light from the light source passes through the translucent material at the exposed regions at a greater level than through the paint layer covering the remaining portions of the body 232. Thus, the lighting of the light source highlights the exposed regions.

In various examples, removal of the paint layer may be achieved by laser etching. In this regard, the exposed regions may be customized with relative ease. Thus, any feature, face, name, message or other indicia may be formed with the exposed regions.

The various examples set forth herein are described in terms of example block diagrams, flow charts and other illustrations. Those skilled in the art will appreciate that the illustrated examples and their various alternatives can be implemented without confinement to the illustrated examples. For example, block diagrams and their accompanying description should not be construed as mandating a particular architecture or configuration.

What is claimed is:

1. A method, comprising:
    adding liquid clear resin to a mold, the mold having an outer mold portion and an inner mold portion, the inner mold portion being formed of soft rubber;
    curing the liquid clear resin to form a translucent body, wherein the outer mold portion forms a decorative outer surface on the translucent body, and wherein the inner mold portion forms a hollow cavity within the translucent body;
    removing the outer mold portion;
    removing the inner mold portion through an opening of the translucent body,
    depositing a paint layer to substantially cover the outer surface of the translucent body; and
    removing paint from select regions of the paint layer to expose the outer surface of the translucent body, at least one select region forming a decorative shape.

2. The method of claim 1, further comprising:
    depositing a clear coating to an inner surface of the translucent body.

3. The method of claim 1, wherein the translucent hollow body is in the shape of a pumpkin.

4. The method of claim 1, wherein the decorative shape includes a facial feature.

5. The method of claim 1, wherein the decorative shape includes letters forming at least one of a word or a name.

6. The method of claim 1, further comprising:
    providing an electronics portion within the translucent hollow body, the electronics portion including at least one light, the light passing through the translucent portion at a greater level than through the paint layer.

* * * * *